US012561547B2

(12) United States Patent
      Butler

(10) Patent No.:    US 12,561,547 B2
(45) Date of Patent:        Feb. 24, 2026

(54) RECESSABLE RFID FASTENER

(71) Applicant: VenaResources, Inc., Plano, TX (US)

(72) Inventor: Jonathan M. Butler, Gainesville, GA (US)

(73) Assignee: VenaResources, Inc., Plano, TX (US)

( * ) Notice: Subject to any disclaimer, the term of this patent is extended or adjusted under 35 U.S.C. 154(b) by 53 days.

(21) Appl. No.: 18/771,453

(22) Filed: Jul. 12, 2024

(65) Prior Publication Data

US 2025/0021785 A1     Jan. 16, 2025

Related U.S. Application Data

(60) Provisional application No. 63/544,997, filed on Oct. 20, 2023, provisional application No. 63/527,360, filed on Jul. 18, 2023, provisional application No. 63/526,263, filed on Jul. 12, 2023.

(51) Int. Cl.
    *G06K 19/077*     (2006.01)
    *B65D 88/12*     (2006.01)
    *G06K 19/04*     (2006.01)

(52) U.S. Cl.
    CPC ..... *G06K 19/07758* (2013.01); *B65D 88/121* (2013.01); *G06K 19/041* (2013.01)

(58) Field of Classification Search
    CPC ...... G06K 19/00; G06K 19/04; G06K 19/041; G06K 19/07; G06K 19/077; G06K 19/07758; G06K 19/07771; G06K 19/07773; G06K 19/07794; B65D 88/12; B65D 88/76; B65D 88/121; B65D 81/36
    See application file for complete search history.

(56) References Cited

U.S. PATENT DOCUMENTS

| | | | |
|---|---|---|---|
| 6,186,716 B1 | 2/2001 | West et al. | |
| 6,676,353 B1 * | 1/2004 | Haytayan | F16B 25/103 |
| | | | 206/346 |
| 2002/0044063 A1 * | 4/2002 | Blagin | F16B 41/005 |
| | | | 73/761 |
| 2015/0247521 A1 | 9/2015 | Hsieh | |
| 2018/0256232 A1 | 9/2018 | Russell | |
| 2025/0271292 A1 * | 8/2025 | Cosson | G01S 7/4813 |

FOREIGN PATENT DOCUMENTS

| | | |
|---|---|---|
| KR | 10-2013-0040545 | 4/2013 |
| KR | 10-2020-0108448 | 9/2020 |

OTHER PUBLICATIONS

International Search Report and the Written Opinion of the International Searching Authority for PCT/US2024/037848 dated Nov. 6, 2024.

* cited by examiner

*Primary Examiner* — Van T Trieu

(74) *Attorney, Agent, or Firm* — Womble Bond Dickinson (US) LLP

(57)     ABSTRACT

A RFID fastener including a radio frequency transparent body that encloses a RFID module that includes a microchip for storing data and an electrically coupled antenna. The RFID module is embedded or otherwise secured into the body of the fastener and configured to receive and transmit a RF signal. Optionally, the RFID module can be disposed within a washer that is configured to be mounted to a substrate by a conventional fastener, such as, for example and without limitation, a screw, a nail and or a staple.

28 Claims, 14 Drawing Sheets

RECESSABLE RFID FASTENER

REFERENCE TO RELATED APPLICATIONS

The present patent application claims benefit of U.S. Provisional Patent Application No. 63/544,997, filed Oct. 20, 2023, and claims benefit of U.S. Provisional Patent Application No. 63/527,360, filed Jul. 18, 2023, and claims benefit of U.S. Patent Provisional Application No. 63/526, 263, filed Jul. 12, 2023.

INCORPORATION BY REFERENCE

U.S. Provisional Patent Application No. 63/544,997, filed Oct. 20, 2023, U.S. Provisional Patent Application No. 63/527,360, filed Jul. 18, 2023, and U.S. Provisional Patent Application No. 63/526,263, filed Jul. 12, 2023, are specifically incorporation by reference herein as if set forth in their entireties.

TECHNICAL FIELD

The present disclosure relates generally to systems, apparatus and methods in the field of fasteners, more particularly, to various aspects involving systems and methods for a fastener having a radio frequency identification (RFID) tag embedded and/or attached to a portion of the head or body of the fastener.

BACKGROUND

Radio frequency identification systems (RFID) are a form of wireless communication that utilizes radio waves to identify and track objects. Conventional RFID tags may be passive, active, or semi-active and each tag carries a unique identification number; which is programmed at the time of manufacturing to ensure the object carries a distinctive identity and description. Conventional RFID systems typically include a reader (or an interrogator) and a tag (or transponder). The tag includes a microchip that stores data and an attached antenna. In use, .RFID tags can be attached to an object, i.e., a substrate, and can store or transmit information concerning the object, such as a unique identifying number, object status such as opened or unopened, location, and the like.

There are generally two different methods of communicating with an RFID tag—near-field and far-field, with the main difference between the two methods being the reading distance. Near-field communication (NFC) transmits data either through inductive coupling between the reader and the tag, or through capacitive coupling, with inductive coupling being more popular in use. Far-field communication (FFC) involves sending and receiving electromagnetic (EM) waves, typically through the use of capacitive coupling (or propagation coupling).

Conventional passive RFID tags have no internal power source and instead draw power from the field created by the external reader and use the energy from the field to power the microchip's circuits. With passive RFID, the RFID tag is irradiated with radio frequency waves from the RFID reader. The RFID tag uses the energy from the radio frequency waves to emit an RFID signal, containing the RFID tag identification location or other data, back to the RFID reader. Conversely, active RFID tags are self-powered through at least one coupled power source, such as an exemplary battery, and transmitters and are configured to continuously transmit an RFID signal that contains the RFID tag identification location or other data, back to the RFID reader. For either the active or passive RFID tags, the RFID reader is configured to receive the RFID tag information and software can be used to interpret the information on the tag, such as calculating a tag's location.

In complicated distribution, storage, transportation and conveying processes, shipping container carriers such as pallets are often being used to stack and transport goods to increase operation efficiency To facilitate transportation of goods and distribution of the pallets, some vendors deliver the goods with the pallets to customers and retrieve the pallets at the next shipment. However, such a practice is prone to create customer complaints. The pallets, which are shipped with the goods by the upstream suppliers to customer sites, are often stored in warehouses and they cannot be retrieved quickly. The pallets reclaimed by the suppliers are typically reused and worn pallets of the same dimensional size. The reused pallets become a loss to the upstream suppliers and disputes arise. To avoid such a situation, some upstream suppliers directly stack the goods on customer's pallets during shipment so that the pallets can be reclaimed directly. However, such a practice incurs increased costs and lowers operation efficiency.

Present enterprises that use shipping containers such as pallets to transport goods in the distribution operation often employ bar codes to stick to the pallets or goods. These bar code stickers can be removed either purposefully or non-purposefully from the shipping container and typically are not designed for extended and repeated use. Moreover, as the exemplary pallets often are used to hold goods and moved in factories, impact and scraping of the bar code stickers occur frequently. Thus, conventional bar codes are often worn, smeared, or lost and, as a result, the pallets to which the bar codes are "attached" could become unrecognizable or unscannable to an associated product distribution system. Furthermore, bonding and maintaining the bar codes with human labor are costly, which is not suitable for mass application. Some vendors try to use RFID on the pallets by bonding the RFID labels to the surface of the pallets. However, in such a method the RFID labels are easily damaged or lost due to impacts during transportation.

In view of the prior aft, there remains a need for a fastener having a passive or active radio frequency identification (RFID) tag embedded and/or attached to a portion of the head and/or body of the fastener that is configured to be coupled to a conventional shipping container, such as the exemplified shipping pallet, such that the RFID tag is protectively recessed within the pallet or otherwise protected when fixed to the pallet.

SUMMARY

To improve the state of the art, disclosed herein is a fastener having a passive or active radio frequency identification (RFID) tag embedded and/or attached to a portion of the head and/or body of the RFID fastener, and methods of use thereof, utilizing novel functionalities. Optionally, the RFID fastener can include a passive or active RFID tag formed in a washer that can allow for mounting to a shipping container by a conventional fastener. In either embodiment, it is contemplated that the RFID fastener is configured to mount to or within a portion of a substrate, such as, for example, a selected portion of conventional packaging or conventional pallet systems.

In embodiments, the RFID fastener of the present disclosure includes a radio frequency transparent body that encloses a conventional RFID module that includes a microchip for storing data and an electrically coupled antenna. The microchip is embedded or otherwise secured into the body of the fastener and is configured to electrically coupled to the antenna in order to receive and transmit the RF signal. Optionally, the RFID module can include a power source, such as an exemplary battery and/or a transmitter. In a further aspect, the RFID module can be affixed to the underlying structure by a conventional fastener.

In operation, in embodiments, the RFID fastener can be inserted into a selected portion of a conventional shipping container, such as an exemplified pallet so that the RFID module of the fastener is recessed within a portion of the pallet or is otherwise positioned below the surface level of the portion of the pallet to which the RFID fastener is connected. The recessed RFID fastener, and the pallet to which it is fastened, can then be detected and identified by a reader. Optionally, in embodiments, the RFID fastener can be attached to the pallet in a position that protects the fastener from conventional wear damage.

Still other aspects, embodiments, and advantages of these exemplary aspects and embodiments, are discussed in detail below. Moreover, it is to be understood that both the foregoing information and the following detailed description are merely illustrative examples of various aspects and embodiments and are intended to provide an overview or framework for understanding the nature and character of the claimed aspects and embodiments. Accordingly, these and other objects, along with advantages and features of the present invention herein disclosed, will become apparent through reference to the following description and the accompanying drawings. Furthermore, it is to be understood that the features of the various embodiments described herein are not mutually exclusive and can exist in various combinations and permutations.

BRIEF DESCRIPTION OF THE DRAWINGS

The accompanying drawings, which are included to provide a further understanding of the embodiments of the present disclosure, are incorporated in and constitute a part of this specification, illustrate embodiments of the present disclosure, and together with the detailed description, serve to explain the principles of the embodiments discussed herein. No attempt is made to show structural details of this disclosure in more detail than can be necessary for a fundamental understanding of the exemplary embodiments discussed herein and the various ways in which they can be practiced. According to common practice, the various features of the drawings discussed below are not necessarily drawn to scale. Dimensions of various features and elements in the drawings can be expanded or reduced to more clearly illustrate the embodiments of the disclosure.

FIGS. 15A-15C schematically illustrate optional embodiments of a RFID fastener having an RFID module disposed within a washer that is configured to be mounted by a conventional fastener, such as, for example and without limitation, a screw, a nail and the like. FIG. 15A is a side elevational view showing the conventional fastener extending through a bore defined in the RFID washer module; FIG. 15B is a top elevational perspective view; and FIG. 15C bottom elevational perspective view.

FIGS. 16A-16C schematically illustrate optional embodiments of a RFID fastener having an RFID module disposed within a washer that is configured to be mounted by a conventional fastener, such as, for example and without limitation, a staple and the like. FIG. 16A is a side elevational view showing the conventional fastener extending through a bore defined in the RFID washer module; FIG. 16B is a top elevational perspective view; and FIG. 16C bottom elevational perspective view.

DETAILED DESCRIPTION

Figure 1:
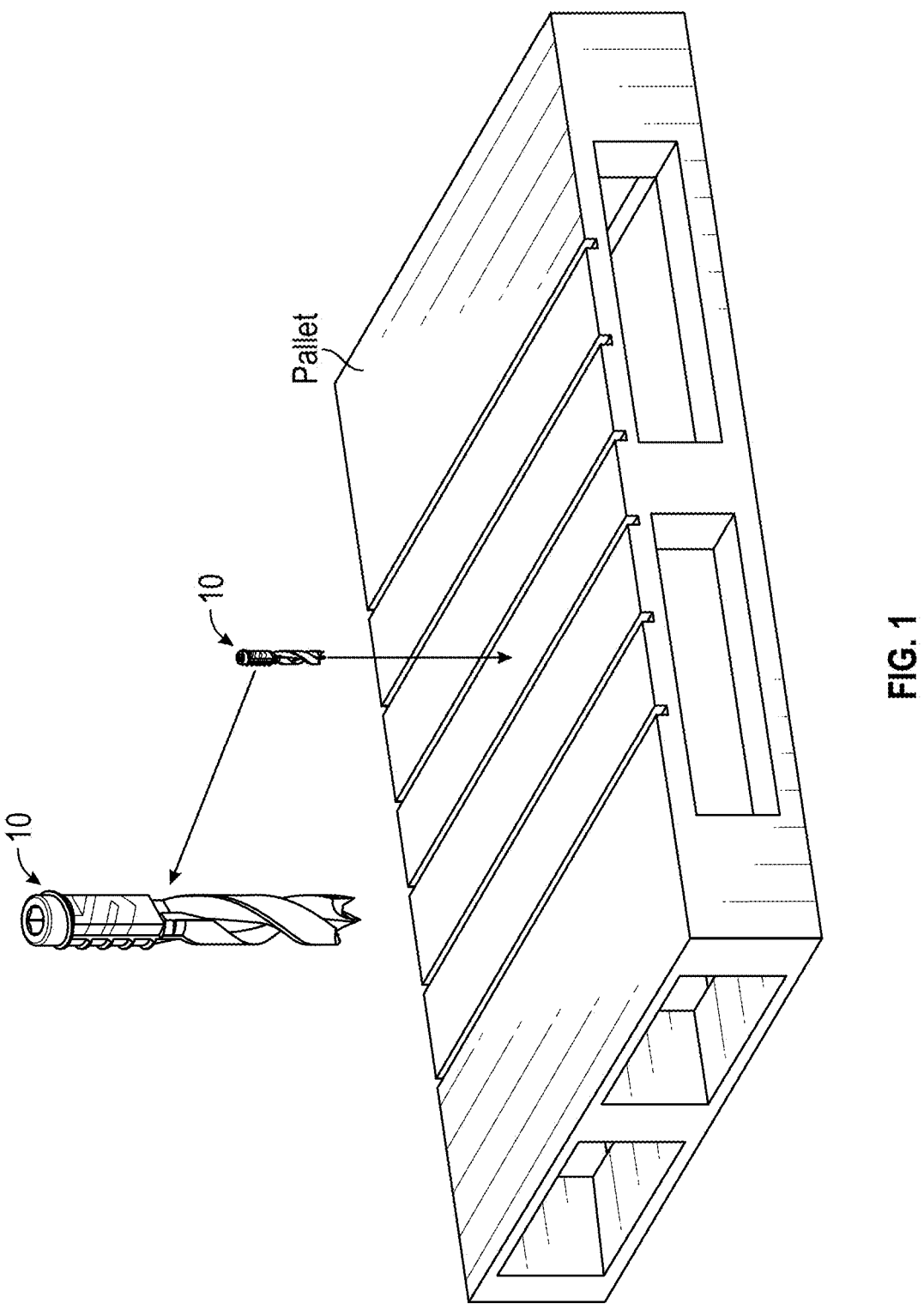
FIG. 1 schematically illustrates an example of a RFID fastener configured for insertion therein a conventional pallet, and showing an enlarged view of the RFID fastener.

The present invention can be understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a," "an" and "the" include plural referents unless the context clearly dictates otherwise. Thus, for example, reference to "a thread" can include two or more such threads unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "can," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular embodiment.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to any claims. Use of ordinal terms such as "first,"

"second," "third," and the like in the claims to modify a claim element does not by itself connote any priority, precedence, or order of one claim element over another or the temporal order in which acts of a method are performed but are used merely as labels to distinguish one claim element having a certain name from another element having a same name (but for use of the ordinary term) to distinguish claim elements.

Disclosed are embodiments of a RFID fastener having a longitudinal elongate length. It should be appreciated that the fastener length may vary in other alternative embodiments of the present disclosure as further discussed below.

Disclosed are components that can be used to perform the disclosed methods and systems. These and other components are disclosed herein, and it is understood that when combinations, subsets, interactions, groups, etc. of these components are disclosed that while specific reference to each various individual and collective combinations and permutation of these cannot be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems can be understood more readily by reference to the following detailed description of preferred embodiments and the examples included therein and to the Figures and their previous and following description.

As shown and described herein, the present methods and systems aim to employ RFID that is adapted to and is capable of withstanding harsh operational environments to overcome the recognition problems occurred to conventional techniques. In embodiments, the RFID fastener of the present disclosure includes a radio frequency transparent body that encloses a conventional RFID module that includes a microchip for storing data and an electrically coupled antenna. The microchip is embedded or otherwise secured into the body of the fastener and is configured to be electrically coupled to the antenna in order to receive and transmit the RF signal.

In embodiments, the RFID fastener 10 of the present disclosure includes a conventional RFID module 12. The RFID module 12 includes microchip 14 for storing data and an electrically coupled antenna 16. The microchip is electrically coupled to the antenna and includes transmission means in order to receive and transmit the RF signal. The microchip of the RFID fastener is configured to operably coupled with a reader that receives the same frequency range, which can, for example and without limitation, can range between about 840-960 MHz, with standard bit depth. Optionally, the RFID module 12 can be either an active or a passive type, but, preferably, the RFID module is a passive type. For the active type of RFID tag, the RFID module 12 would also include at least one power source, such as, and without limitation, a battery, which is coupled to the microchip, the antenna, and transmission means for transmitting the RF signal.

The conventional pallet, whether it is made from wood or a polymer for example, generally has a loading surface and a plurality of support legs to hold the loading surface. The most commonly used pallets are wooden pallets and polymer pallets, but pallets formed from other materials are contemplated that allow for insertion or coupling of the fastener to a portion of the pallet structure. An exemplary conventional pallet is schematically illustrated in FIG. 1.

In embodiments exemplarily illustrated in FIGS. 2-9, the RFID fastener 10 can extend along a longitudinal axis L and includes a fastener body 20 having an upper portion 30 and a connected lower portion 60 that are co-axially aligned. The upper portion 30 of the fastener body includes a head 32 and a first shank portion 34 that is integrally connected to a distal end 33 of the head 32. The upper portion 30 of the RFID fastener 10 has a cylindrical shape having an outer surface 31. As shown, it is contemplated in this embodiment that the diameter of the head 32 of the upper portion 30 and the diameter of the first shank portion 34 has the same diameter.

As shown, the upper portion 30 further includes a helical thread 36 that is integrally connected to and extends outwardly from the portions of the outer surface of the upper portion. In one aspect, the resultant threaded surface can extend along a prescribed elongate length of the upper portion 30 of the fastener body 20. In optional exemplary aspects, the prescribed elongate length can include a length: a) extending from a distal end 38 of the upper portion 30 a desired distance toward the distal end 33 of the head 32; b) extending from a distal end 38 of the upper portion 30 a desired distance to the proximal end 35 of the head; or c) extending from proximate the distal end 38 of the upper portion a desired distance proximate to the proximal end 35 of the head. Thus, in an exemplified embodiment, it is contemplated that the helical thread 36 can extend outwardly from portions of the outer surface 31 of the upper portion 30 of the fastener body to include portions of the first shank portion 34 and/or the head 32.

In embodiments, it is contemplated that the thread pitch of the helical thread 36 can be a course thread pitch to increase pullout resistance and to increase the structural resistance to deformity of the upper portion 30 of the fastener body. In exemplary aspects, the thread pitch, which is conventionally defined as the millimeter distance between two threads of the helical thread 36 can be between about 2.5 to about 6.0, preferably between about 3.0 to 5.5, and more preferably between about 3.5 to about 5. In one exemplified embodiment, the thread pitch of the helical thread 36 can be about 4.5.

In embodiments, the first shank portion 34 further defines a longitudinally extending recess 40 that can extend between proximate the distal end of the upper portion and proximate the head of the upper portion. As shown, the recess 40 has an operative depth $d_1$ and width $w_1$ to complementarily receive the RFID module 12 such that the outer portions of the RFID module are positioned below the outer surface 31 of the upper portion 30.

In embodiments, the recess 40 has a first wall 42 proximate the distal end of the head, an opposed second wall 44 that is proximate the distal end of the first shank portion of the upper portion, and a floor 46 that extends between the respective first and second walls. In embodiments, the first and second walls 42, 44 of the recess 40 can be positioned normal to the longitudinal axis of the RFID fastener. In other embodiments, the floor 46 of the recess 40 can have a substantially planar shape that extends substantially parallel to the longitudinal axis L of the RFID fastener 10. In an exemplary aspect, the floor 46 of the recess 40 can have a substantially planar shape that is co-planer with the longitudinal axis L of the RFID fastener 10.

In embodiments, and as shown, the helical thread 36 is integrally connected to and extends outwardly from the portions of the outer surface 31 of the upper portion 30 that are opposed to the defined recess 40. Thus, in the upper portion 30 of the embodiment, the helical thread 36 is "interrupted" due to the presence of the recess 40. The resulting "interrupted" helical thread pattern acts to provide additional torsional strength to that portion of the first shank portion 34 that defines the recess 40, e.g., the "interrupted" treads function as a plurality of spaced ribs that structurally support that portion of the first shank portion 34 that defines the recess 40.

In an optional aspect, the floor 46 of the recess 40 can include one or more longitudinally extending ribs, not shown, that can extend outwardly portions of the surface of the floor 46 between the first and second walls 42, 44 of the recess to increase tortional resistance of the upper portion 30 of the fastener body 20. In one example, a pair of opposed ribs, positioned on the outside edges of the recess, can be positioned to cradle the elongate edges of the coupled RFID module. It is contemplated that the at least one longitudinally extending rib can help to minimize or eliminate any distortion of the upper portion of the first shank portion during the installation driving process.

In embodiments, the lower portion 60 of the fastener body 20 forms a drilling section 70 that has a second shank portion 64 that has a distal end 66 and a proximal end 68 that is coupled to the distal end 38 of the upper portion 30, e.g., the proximal end of the second shank portion is coupled to the distal end of the first shank portion. In aspects, it is contemplated that the first and second shank portions 34, 64 are integrally connected together. Thus, as shown, the drilling section 70 of the fastener body 20 is positioned distally from the recess 40 defined in the upper portion 30 of the fastener body 20. The drilling section 70 of the fastener body is configured to allow for the RFID fastener 10 to drill into an underlying substrate while concurrently removing material from the formed hole.

The second shank portion 64 of the lower portion of the fastener has a cylindrical shape with an outer diameter that is equal to the diameter of the first shank portion 34 of the upper portion. In embodiments, the respective first and second shank portions 34, 64 of the fastener body 20 have the same diameter, with only the helical thread 36 that is integrally connected to and extends outwardly from the portions of the outer surface 31 of the upper portion terminating at thread tips 37 that have an operative diameter that is greater than the diameters of the respective first and second portions. Thus, the helical thread 36 is configured to operatively engage the surface of the drilled hole formed by the drilling section 70 of the lower portion of the fastener body.

The drilling section 70 is provided with at least one cutting edge 72 that is configured to cut into the surface of a workpiece, such as a pallet, to form a circular hole having a diameter substantially equal to the operative diameter of the distal end of the drilling section. The drilling section 70 also defines at least one helical flute 74 that can wind helically about the longitudinal axis of the RFID fastener as the least one helical flute 74 moves proximally away from the distal end 66 of the second shank portion. In embodiments, the at least one helical flute 74 can wind helically from proximate from the distal end 66 of the second shank portion towards the proximal end 68 of the second shank portion. In embodiments, the at least one helical flute can wind helically from proximate from the distal end 66 of the second shank portion to the proximal end 68 of the second shank portion.

In embodiments, the at least one helical flute 74 can include a plurality of flutes, such as, for example and without limitation, 2 flutes, 3 flutes, and the like. It is contemplated that the respective flutes of the plurality of flutes can be spaced equally about the circumference of the second shank portion of the of the fastener body. In embodiments, as exemplarily shown in the figures, it is also contemplated that, in cross section of the drilling section 70 and at the outer circumference of the second shank portion 60, the operative cross-sectional arcuate length $F_L$ of each of the respective flutes 74 can be substantially the same.

In embodiments, as exemplarily shown in the figures, it is also contemplated that, in cross section of the drilling section 70 and at the outer circumference of the second shank portion 60, the operative cross-sectional arcuate length $F_L$ of the respective flutes 74 can be substantially the same as the operative cross-sectional arcuate length $L_L$ of the respective lands 76 that extend between the flutes 74. Optionally, it is contemplated that, in cross section of the drilling section 70 and at the outer circumference of the second shank portion 60, the operative cross-sectional arcuate length $F_L$ of the respective flutes 74 can be greater than the operative cross-sectional arcuate length $L_L$ of the respective lands 76 that extend between the flutes, or the operative cross-sectional arcuate length $F_L$ of the respective flutes 74 can be less than the operative cross-sectional arcuate length $L_L$ of the respective lands 76 that extend between the flutes.

As one skilled in the art will appreciate, each at least one helical flute 74 forms a discharge groove 80 that extends up though the drilling section 70, which allows for receipt and operative discharge of bits of material cut by the cutting edge of the drilling section. As shown, it is contemplated that the at least one discharge groove can wind helically about the longitudinal axis of the shaft as the discharge groove moves proximally away from the distal end of the drilling section.

In embodiments, it is contemplated that the first shank portion 34 can further define a trough 39 that extends from the distal end of the first shank portion 34 to the recess 40. In this aspect, a portion of a proximal end of the trough 39 is defined in the second wall of the recess. In embodiments and as shown, it is contemplated that at least a portion of the proximal end of at least one helical flute 74 can connect to the trough at the distal end of the first shank portion to allow for the formation of an extended discharge groove. In this aspect, the trough 39 can extend longitudinally between the respective connected helical flute 74 and the recess 40.

The distal end 66 of the lower portion defines a drill tip 90 that is coincident with the longitudinal axis L of the fastener body 20, e.g., the drill tip is preferably directly positioned along the longitudinal axis L but may slightly vary from being along the longitudinal axis due to manufacturing tolerances. It should be appreciated that in this example embodiment, the drill tip has a sharp rounded point. In other embodiments, the drill tip is otherwise suitably rounded or formed.

In examples, it is contemplated that: a) the fastener body 20 can be monolithically formed from a metal or metal alloy member; b) the respective first and second shank portions 30, 60 can be formed from members that comprise the same metal or metal alloy material, which are integrally connected to form the fastener body; and c) the respective first and second shank portions 30, 60 can be formed from separate members that comprise the differing metal or metal alloy materials, which are integrally connected to form the fastener body 20. In embodiments, it is contemplated that the metal or metal alloy can comprise carbon steel and carbon steel alloys. In other embodiments, it is contemplated that at least one of the first and second shank portions 30, 60 can be formed from a rigid polymeric material. In a further optional embodiments, the first and second shank portions 30, 60 can both be formed from a rigid polymeric material.

In embodiments, at least the head 32 of the RFID fastener 10 can be formed from a radio transparent material, such as a radio transparent polymer. It is also contemplated that portions of the first shank portion 30 of the RFID fastener 10 can be formed from such a radio transparent polymer. Such a radio transparent polymer can be, for example and without limitation, Delrin™.

Optionally, the upper portion or portions of the upper portion of the RFID fastener can be formed from a metallic material, which can enhance the range of the RFID by acting as a ground plane for the RFID antenna in the RFID module 12. In other embodiments, it is contemplated that the head 32 of the RFID fastener could be formed from a frangible material, such as, for example and without limitation, an acetal material, that would allow for the head 32 of the RFID fastener to be removed or snapped off after the fastener is affixed within the pallet and the RFID module 12 is disposed below the operative plane of the pallet surface.

Figure 10:
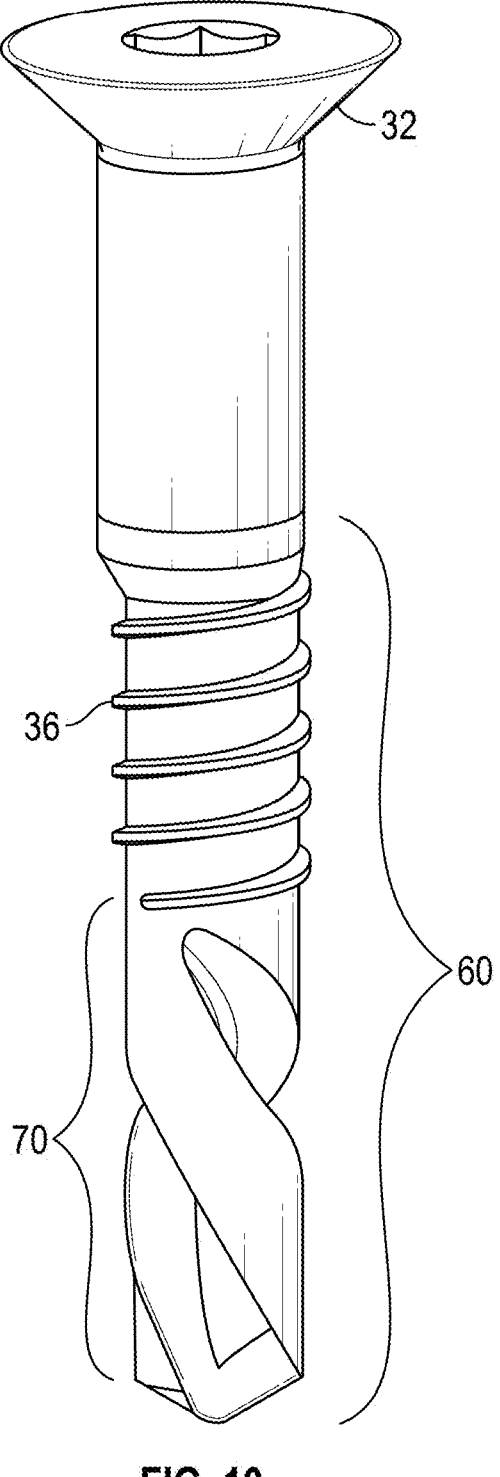
FIG. 10 schematically illustrates one embodiment of a RFID fastener having an RFID module disposed within a portion of a shaft of the fastener adjacent the head of the fastener.
Figures 11A, 11B, 11C:
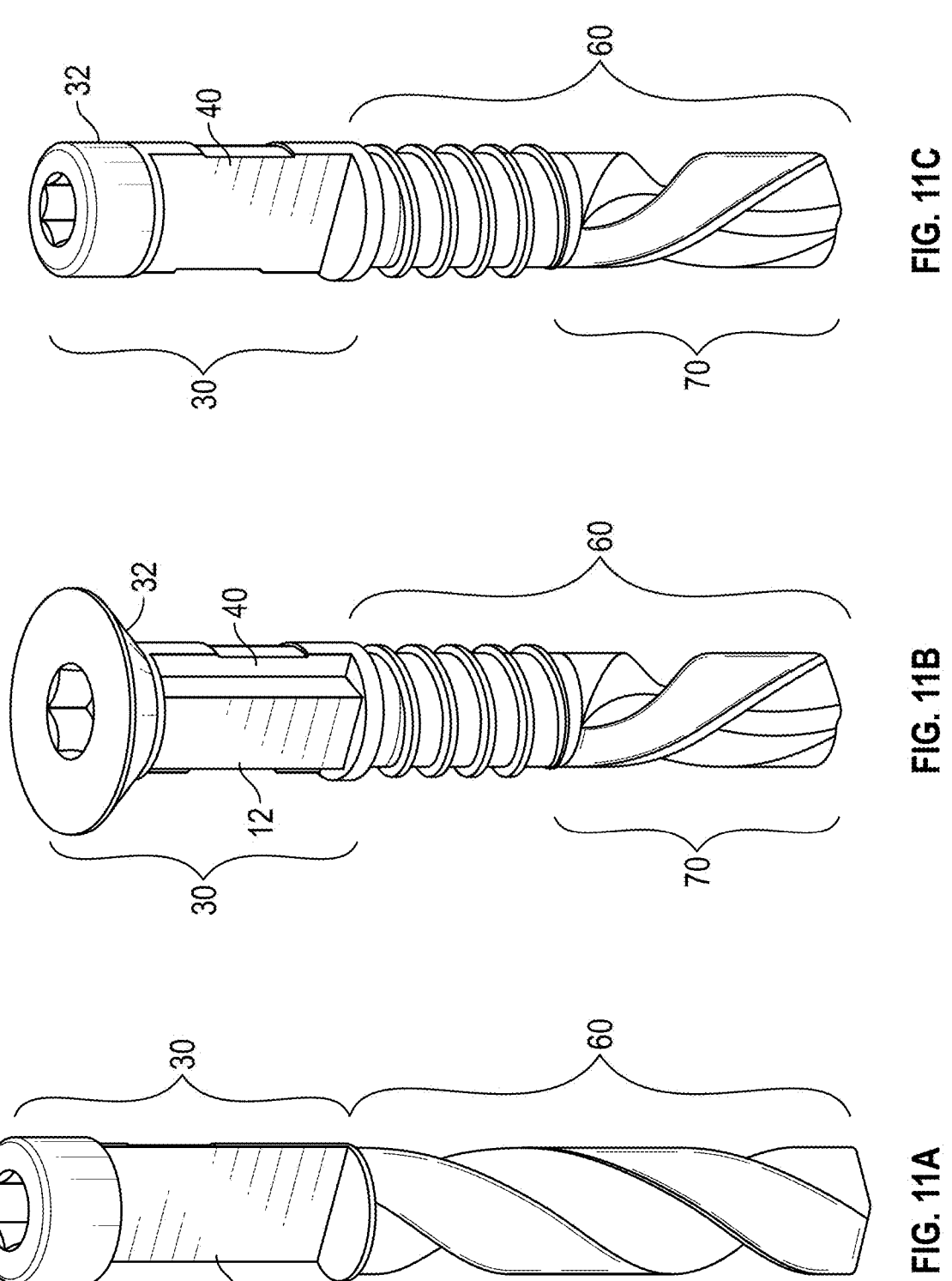
FIGS. 11A-11C schematically show elevational views of optional embodiments of the RFID fastener of FIG. 10 having an RFID module disposed within a shaft of the fastener adjacent the head of the fastener, the RFID fastener being configured to be driven below the surface of a member of the pallet such that the RFID module is protected from the external environment.

In optional embodiments and as shown in FIGS. 10, 11B and 11C, the drilling section 70 can be formed distally from the helical threads 36 of the RFID fastener 10. If so configured, or as shown in FIG. 11A, the drilling section 70 can be formed distally of the recess 40. In either exemplary aspect, it is contemplated that the drilling section 70 would form the distal most portion of the fastener body 20.

In the embodiments shown in FIGS. 10, 11B and 11C, both the helical thread 36 and the drilling section 70 are defined on the lower portion 60 of the fastener body 20 and the recess 40 is defined in a portion of the upper portion 30 of the fastener body 20 between the head and the distal end of the upper portion.

As shown in FIGS. 2-8, 11A, 11C, the head 32 can be generally cylindrical and of a uniform diameter that is equal to the diameter of the upper portion of the fastener body. In various options, the proximal end of the head can present a uniform surface or, optionally, can define an opening where a drive feature is located (suitable for complementary coupling to a drive unit).

Figure 12:
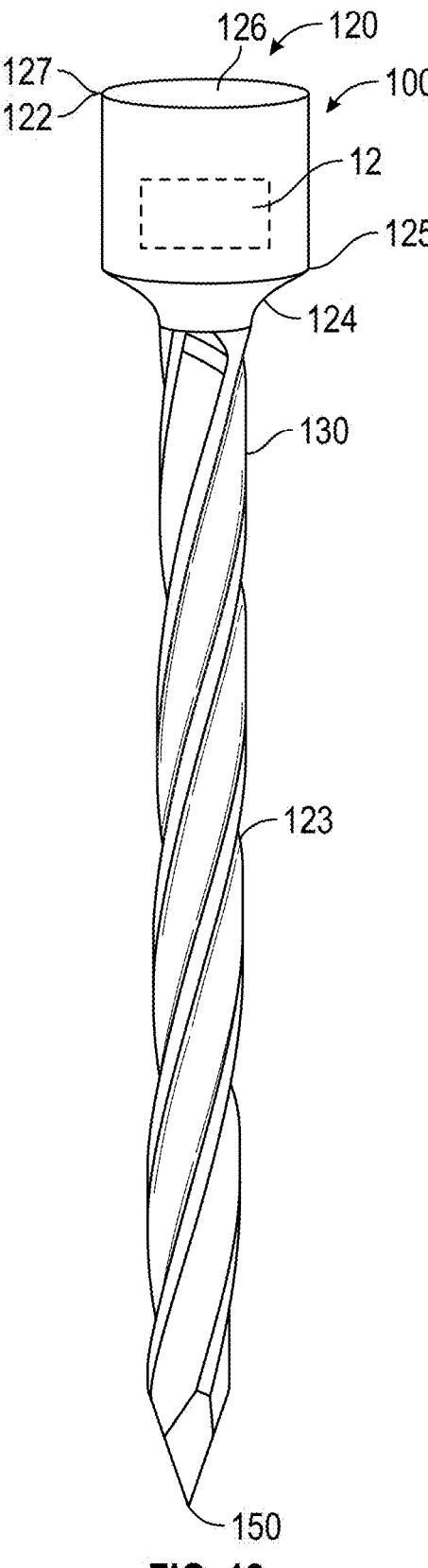
FIG. 12 schematically illustrates one embodiment of a RFID fastener having an RFID module disposed within a portion of the head of the RFID fastener, FIGS. 13A-13C schematically show elevational views of optional embodiments of the RFID fastener of FIG. 12 having an RFID module disposed within a portion of the head and/or shaft of the fastener, at least a portion of the RFID fastener being configured to be driven below the surface of member of the pallet such that the RFID module is protected from the external environment.
Figure 13C:
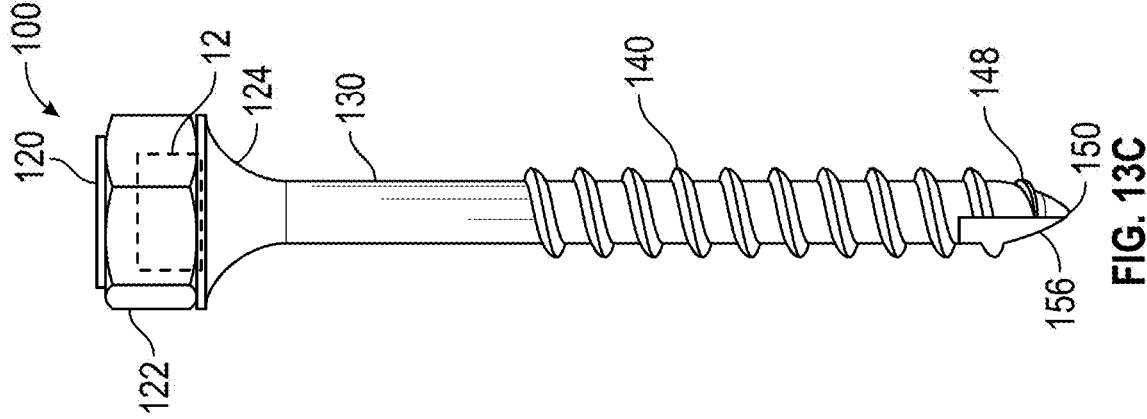

In embodiments exemplarily illustrated in FIGS. 12-13C, the RFID fastener 10 can be in the form of a threaded RFID fastener 100, and more particularly, a RFID fastener 100 including a head 120 and a shaft 130. The head can include a top portion 122 and a bottom portion 124. The top portion 122 can be of a uniform diameter or can be of other dimensions if desired. In one aspect, the top portion 122 begins to transition to the bottom portion 124, where it tapers down to the shaft 130 of the threaded RFID fastener 100. Optionally, the bottom portion 124 can be in a frusto-conical form.

In embodiments, the top portion 122 of the head 120 can be generally cylindrical and can be shaped to transition to the bottom portion 124, where it tapers down to the shaft 130 of the threaded RFID fastener 100. Optionally, and as shown, the lower portion can be in a frustoconical form. It is contemplated that the proximal end 127 of the top portion 122 can present a uniform surface or, optionally, can define an opening where a drive feature is located (suitable for complementary coupling to a drive unit).

In operation, the threaded RFID fastener 100 shown in FIG. 12 can include a plurality of flutes 123 running the length of the shaft 130 that are configured to provide strong resistance to backing out of the installed position in the desired material, such as an exemplified pallet. The tapered bottom portion 124 of the head 120 would allow the entire head of the threaded RFID fastener 100 to be recessed down and below the surface level of the material into which the RFID fastener is inserted. Thus, there would be no protrusion of the head of the threaded RFID fastener 100 from the material once inserted.

In embodiments, the proximal end of the head 32, 120 of the respective RFID fastener 10, 100 can define a screw-drive feature, such as a star drive, a Phillips head drive or any other suitable drive. The screw drive feature can define a hole in the head, and can be compatible with any suitable drive feature, as noted above. The particular drive and size of the hole of the head can vary.

Figure 2:
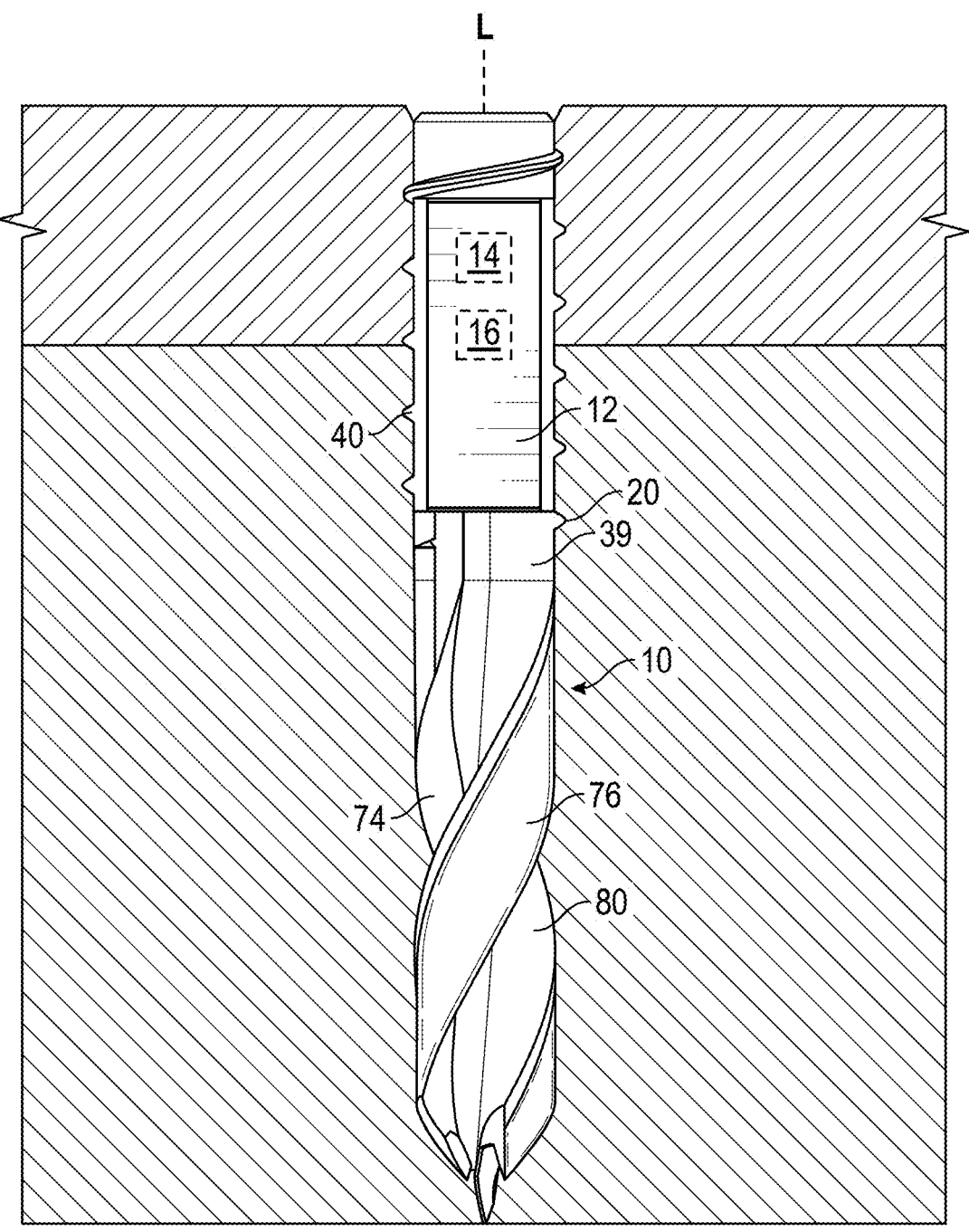
FIG. 2 schematically illustrates one embodiment of a RFID fastener having an RFID module disposed within a portion of the shank of the RFID fastener, the RFID fastener being configured to be driven below the surface of a member of the conventional pallet such that the RFID module is protected from the external environment.
Figure 3:
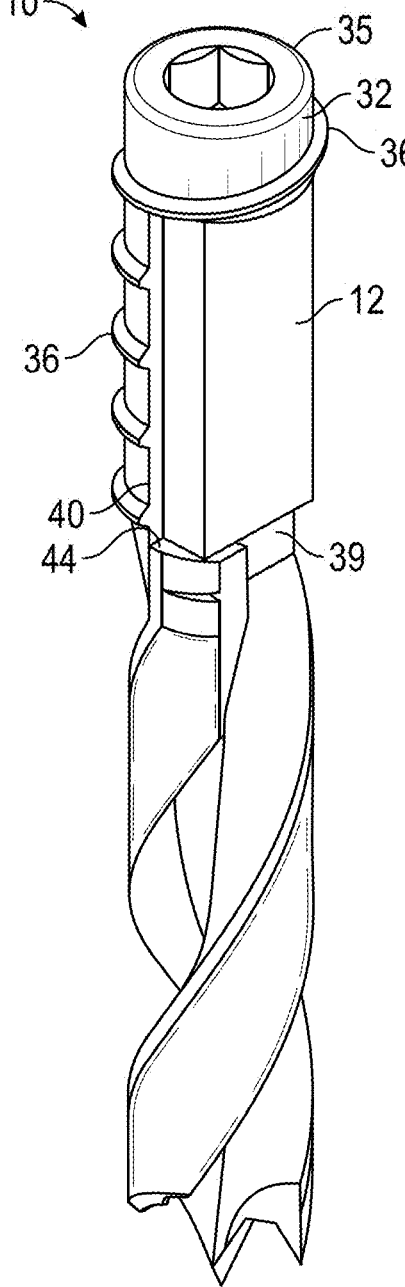
FIG. 3 shows a top perspective view of the RFID fastener of FIG. 2, showing the RFID module disposed within a portion of the shank of the RFID fastener adjacent the head of the fastener.
Figure 4:
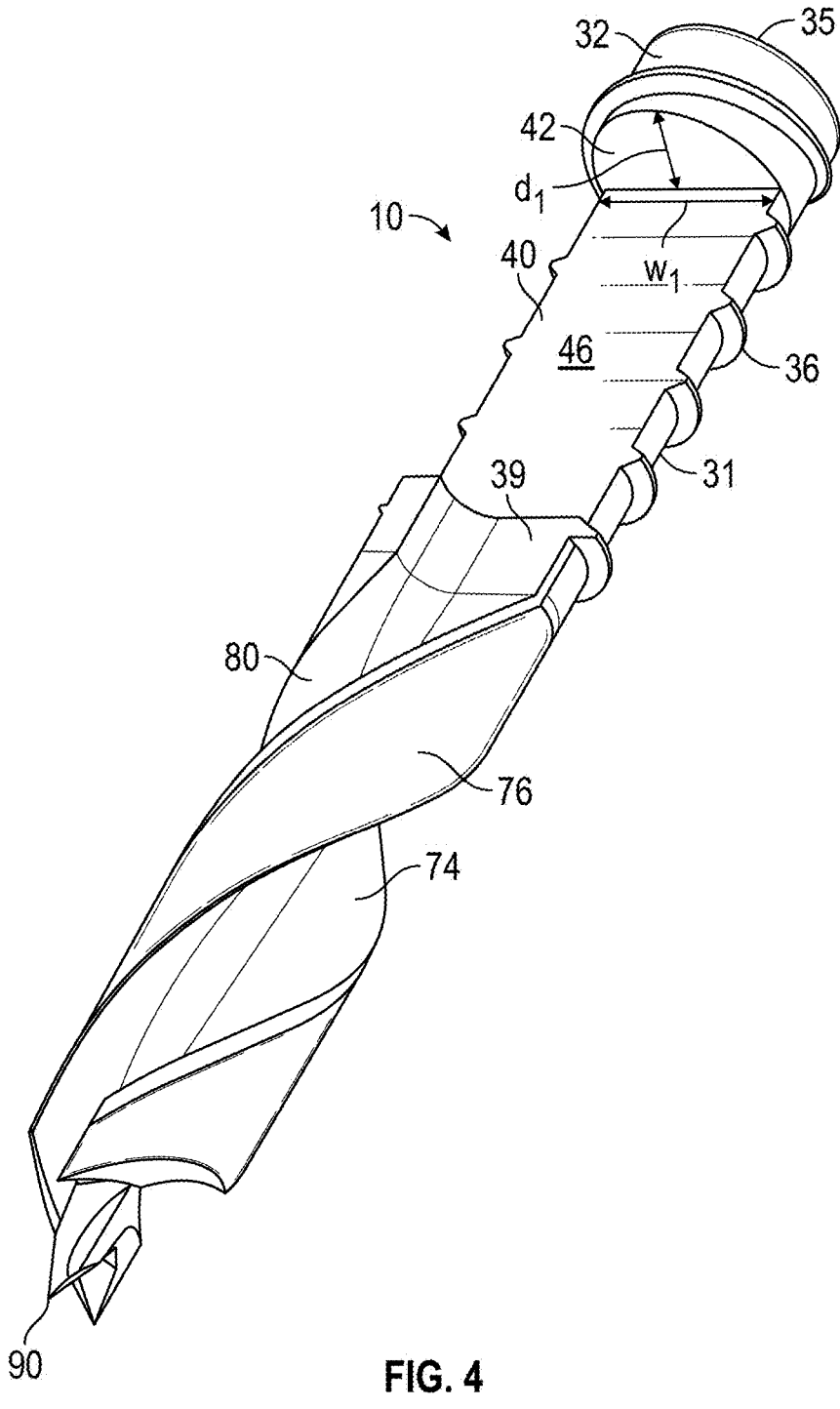
FIG. 4 shows a perspective view a RFID fastener with the RFID module removed from the fastener body.
Figure 5:
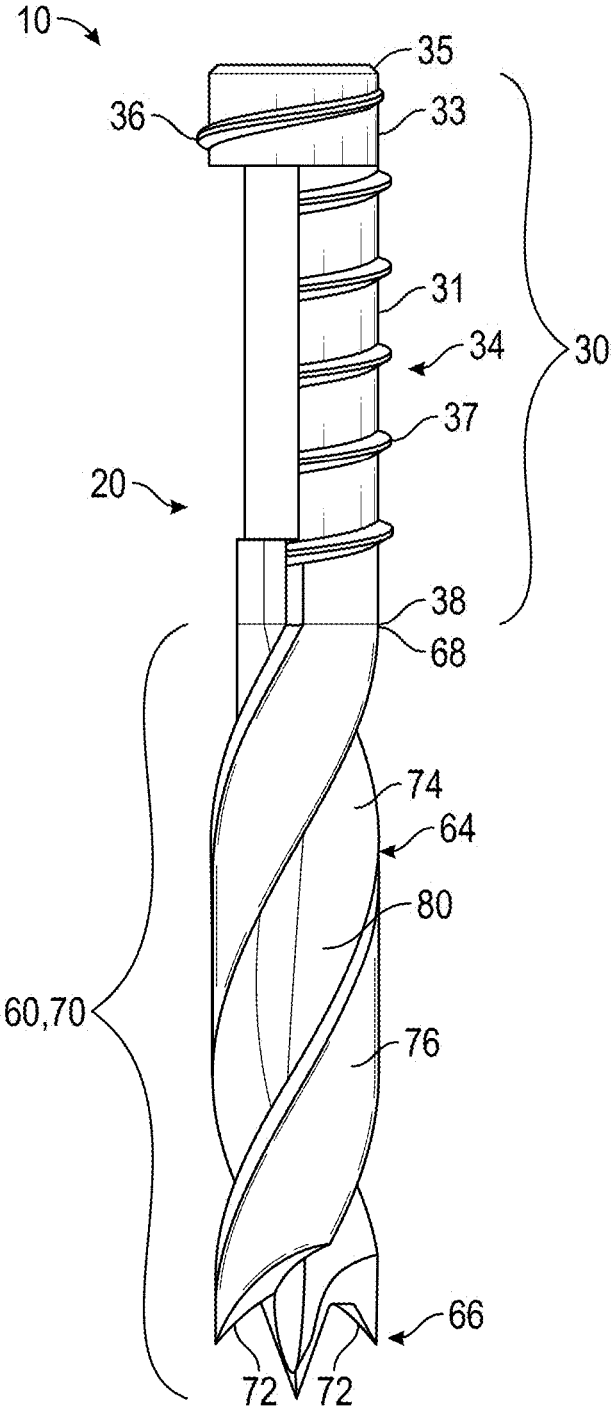
FIG. 5 shows a side perspective view the RFID fastener of FIG. 4.
Figure 6:
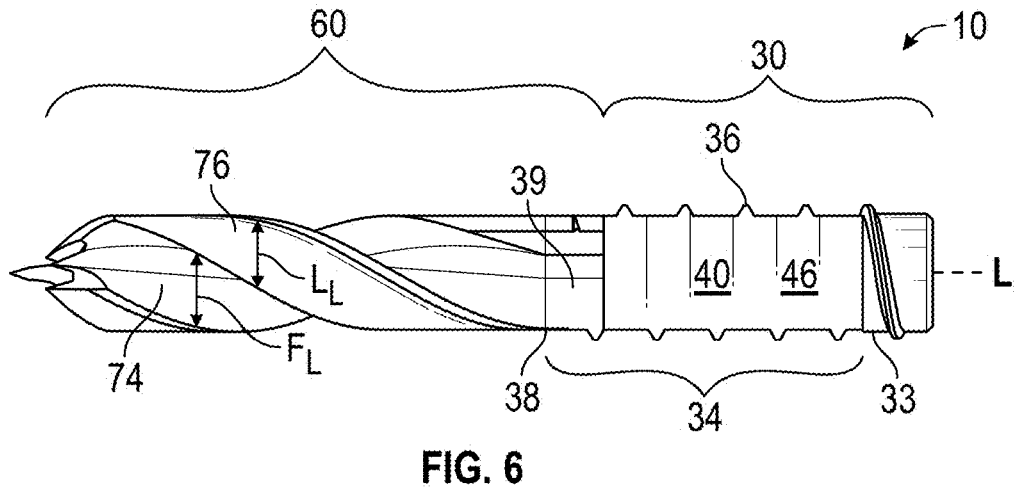
FIG. 6 shows a side elevational view the RFID fastener of FIG. 4.
Figure 7:
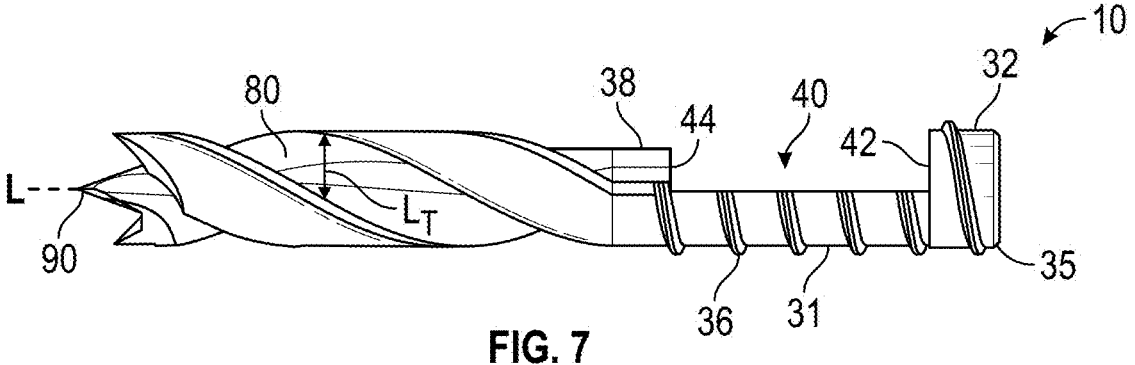
FIG. 7 shows a side elevational view the RFID fastener of FIG. 4, rotated 90 degrees about the longitudinal axis of the RFID fastener of FIG. 6.
Figures 8, 9:
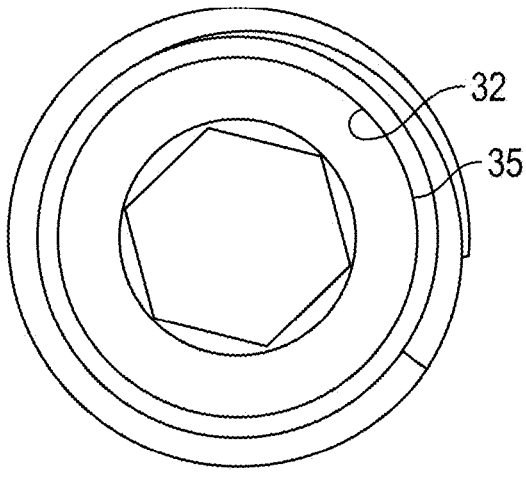
FIG. 8 shows a top elevational view the RFID fastener of FIG. 4.
FIG. 9 shows a bottom elevational perspective view the RFID fastener of FIG. 4.
Figure 14:
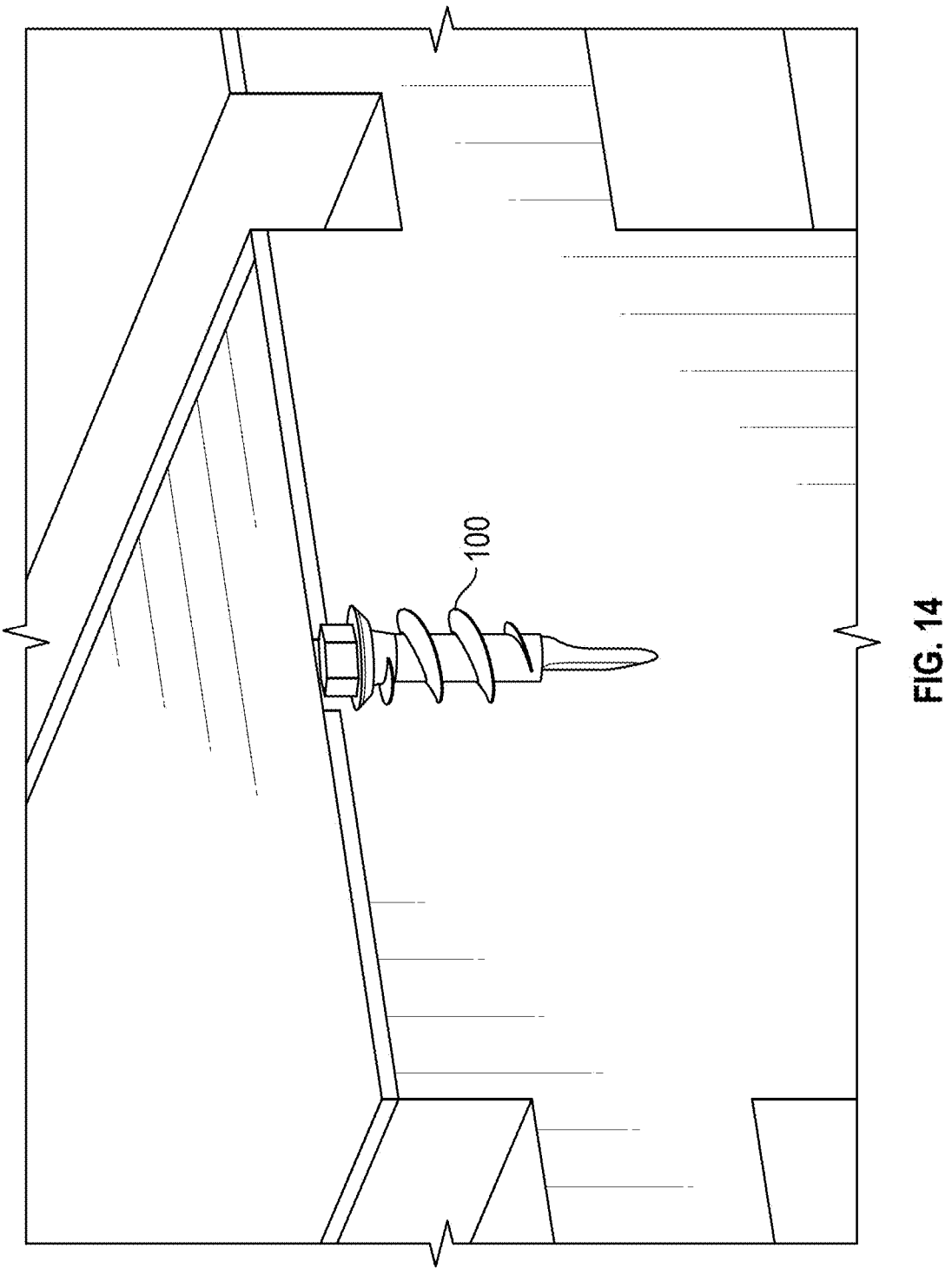
FIG. 14 schematically illustrates the RFID fastener of FIG. 13B driven below the surface of member of the pallet such that the RFID module positioned in a portion or the head and/or shaft of the driven fastener is protected from the external environment.

In embodiments, the screw-drive feature of the respective RFID fastener 10, 100 can be connected to a rotary operated tool, such as a drill, that turns the head, and thus the RFID fastener 10, to advance the fastener into a work piece, such as a pallet, as exemplarily shown in FIGS. 2 and 14. In the exemplary aspect, without limitation, in which the RFID fastener 10, 100 is being driven into a conventional wood or polymer pallet, the RFID fastener 10, 100 would be driven through the top plank of the pallet for positioning at least partially into the center block of the pallet. Thus, the head 32, 120 of the respective RFID fastener 10, 100 would be recessed to a depth sufficient that no part of the head extends above the top plank. This recessed position helps to minimize damage to the RFID fastener during operation.

Figure 13B:
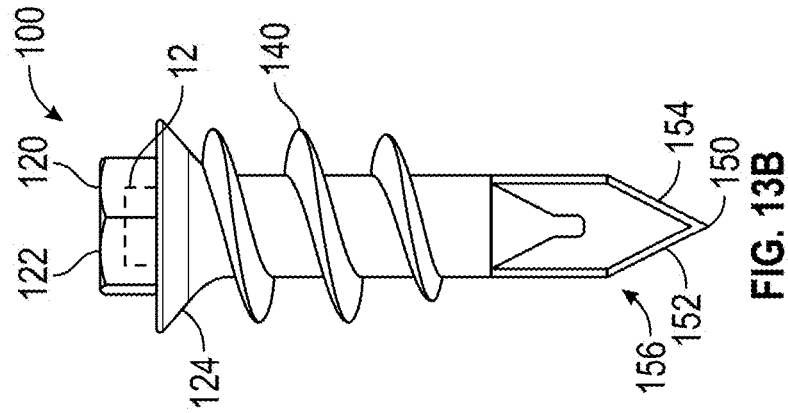
Figure 13A:
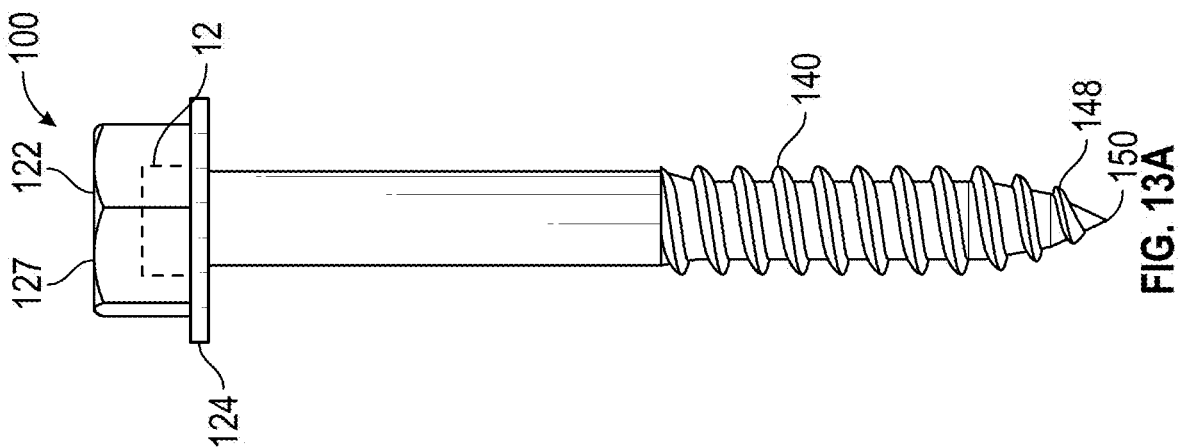

Optionally, in embodiments and as exemplarily shown in FIGS. 13A-13C, the head of the RFID fastener 100 can be in the form of a hex head. As shown, the head can include a top portion 122 and a bottom portion 124. The top portion 122 can be of a uniform diameter or can be of other dimensions if desired. As shown in FIGS. 13A-13C, the top portion 122 of the head can have a plurality of engagement surfaces extending normal to the axis of the shaft of the RFID fastener 100. The exemplary head 120 of the RFID fastener 100 has six substantially equal faces positioned in a hex-head orientation, but fewer or more faces are contemplated, which faces are positioned in a conventional generally cylindrical arrangement for conventional attachment to a complementarily shaped drive unit. In FIG. 13A, the top portion 122 transitions to a bottom portion 124 having a diameter greater than the operable diameter of the top portion 122. In FIG. 13B, the top portion 122 transitions to a bottom portion 124 that initially has a diameter greater than the operable diameter of the upper portion 22 and then tapers down to the shaft 130 of the RFID fastener 100. Optionally, in FIG. 13C, the top portion 122 transitions to a bottom portion 124 that initially has a diameter substantially equal to the operable diameter of the top portion and then tapers down to the shaft 130 of the RFID fastener 100. In embodiments, at least a portion of the bottom portion of the shaft can have a frustoconical form.

In operation, the RFID fastener 100 shown in FIGS. 13A-13C can include at least one helical thread 140 that protrudes from at least a portion of the shaft and coils around it. In embodiments, the at least one helical thread 140 can continue to the distal end 150 of the RFID fastener 100. Optionally, and as shown in FIG. 13B, one or more of the helical threads may be included in the end, possibly merging with and forming a portion of one or more inclined surfaces 152, 154 and/or a chisel edge 156.

In embodiments, the at least one helical thread 140 can be configured at a particular pitch to theoretically provide a preselected feed rate of the fastener into a work piece substrate. For example, the at least one helical thread 140 may be pitched to provide a feed rate of about 1 to about 8 millimeters per full revolution of the RFID fastener 100 about its longitudinal axis, also referred to as a screw axis. Other thread pitches can be selected to provide other desired theoretical feed rates.

The at least one helical thread 140 can end at a last thread as shown in FIGS. 13A and 13C. The last thread can terminate at a leading portion 148, which can have a thread height that gradually decreases until it fades into the generally cylindrical portion of the shaft 130. Alternatively, although not shown, the last thread can terminate abruptly, with the leading portion of the last thread having a thread height that is generally the same as the threads located above it on the shaft. With this configuration, the leading portion can terminate at a flat, beveled or sharpened forward surface as desired. Optionally, the location of the leading portion 148, and thus the end of the last thread can vary relative to the distal end.

In embodiments, returning to the distal end of the RFID fastener 100 in general and referring to FIG. 13B, instead of being sharpened to a conical point, the distal end 150 can instead include a chisel edge 156 that includes inclined surfaces 152 and 154 diverging rearwardly from the chisel edge in a V-shaped configuration. The inclined surfaces 152 and 154 can be at a variety of angles relative to the longitudinal axis of the shaft, for example 25°, 35°, 45°, 55°, 65°, 70°, 80°, or any angles therebetween that are suitable for the desired application. Optionally, the inclined surfaces 152 and 154 can be inclined at the same or different angles relative to the longitudinal axis of the shaft 130.

The at least one helical thread 140 of the RFID fastener 100 run along at least a portion of the shaft 130 and is configured to provide strong resistance to backing out of the installed position into the desired material, such as an exemplified pallet. As shown in FIGS. 12, 13B, and 13C, the tapered lower portion 124 of the head 120 would allow the entire head of the RFID fastener to be recessed down and below the surface level of the material into which the RFID fastener is inserted. Thus, there would be no protrusion of the head of the RFID fastener from the material once inserted.

In embodiments and as shown in FIGS. 15A-16C, the RFID fastener 10 can comprise an RFID module washer 200. In this embodiment, the RFID module 12 is disposed within a washer body 210 that is configured to be mounted by a conventional fastener 220, such as, for example and without limitation, a screw, a nail and or a staple. As shown, it is optionally contemplated that the washer body 210 defines at least one bore 212 that extends from an upper surface 214 of the washer through the bottom surface 216. In one aspect, it is contemplated that the RFID module washer 200 would have a low side profile in elevation and could be made from POM/Acetal, RFID transparent polymers, and the like.

In this embodiment, and as shown, the RFID module 12 is disposed within the washer 210. As described above, the RFID module 12 for the RFID module washer 200 would include a radio frequency transparent body that encloses a microchip for storing data and an electrically coupled antenna. The RFID module 12 is embedded or otherwise secured into the body 210 of the washer and the microchip 14 is electrically coupled to the antenna 16 in order to receive and transmit the RF signal.

Figures 15A, 15B, 15C:
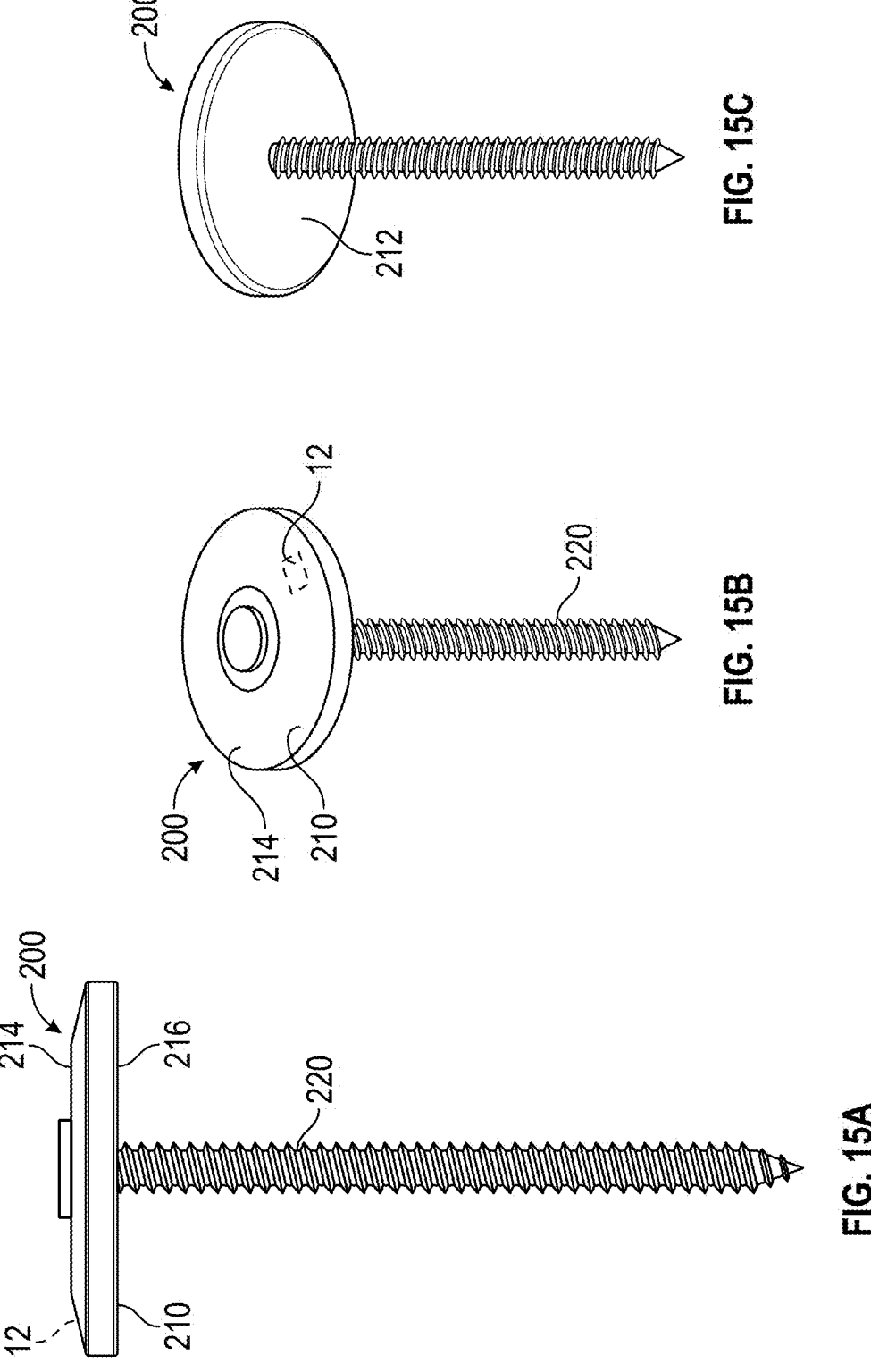
Figure 16C:
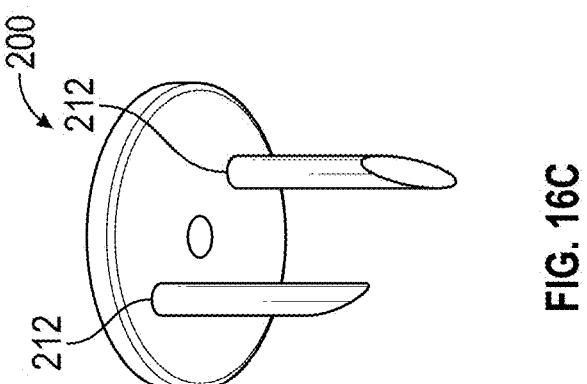
Figure 16B:
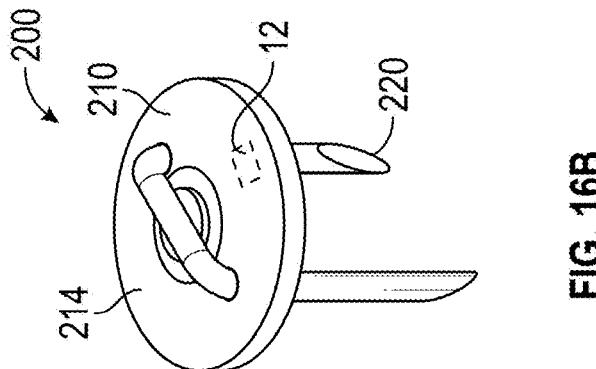
Figure 16A:
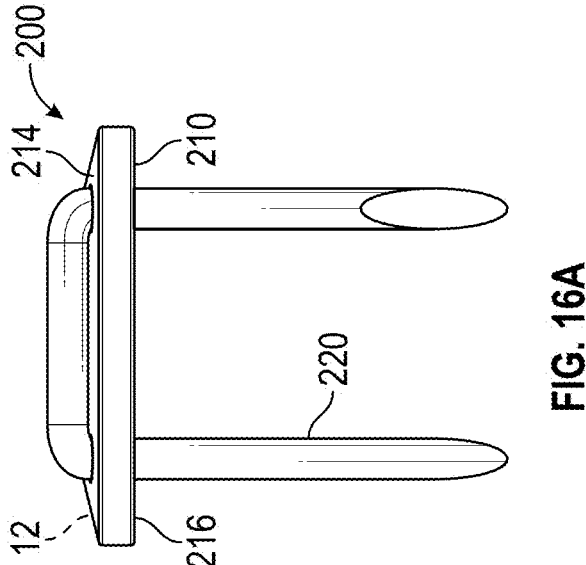

FIGS. 15B, 15C, 16B, and 16C show respective top and bottom elevational perspective views of embodiments of the RFID fastener combination of the RFID module washer 200 and a conventional fastener. In FIGS. 15B and 15C, the RFID module washer 200 shows a conventional fastener 220 (e.g., a nail, screw, and the like) extending through a bore

212 defined in the RFID washer module. Similarly, in FIGS. 16B and 16C, a conventional fastener 220 (e.g., a staple and the like) extending through a pair of bores 212 defined in the RFID washer module.

In operation, the RFID module washer 200 is configured to allow for coupling of the RFID module washer to any desired substrate. For example, and without limitation, the RFID module washer could be stapled, nailed, or screwed to some selected substrate, such as for example, wood, polymer lumber, LVL beams, or other lumber or like products. The RFID module washer 200 can be connected to the desired substrate by the conventional fastener at an early stage in the limber process, like the sawmill, or later on in a lumber assembly process. For example, engineered floor or ceiling joists could be tagged with the RFID module washer/ conventional fastener combination, which can allow for subsequent tracking before, during, and after being built into a structure.

In another embodiment, the use of the RFID module washer can allow for monitoring of nail/screw (conventional fastener) usage. For example, Tyvek™ wrapping typically requires a recommended number of nails to secure it to an underlying structure. Using the exemplified RFID module washer 200 with each fastener 220 would give an inspector or auditor a way to scan the number of nails used at an installation.

By means of the designs set forth above, the pallet having such a coupled RFID fastener can be used and reused for a long period of time without damage or loss. In addition to providing recognizable pallets for different vendors, it also can be used by the same vendor, to differentiate stocks and inventory held on the pallets.

Accordingly, modifications may be made to the embodiments without departing from the scope of the invention. For example, modifications may be made to the systems and apparatuses disclosed herein. The components of the systems and apparatuses may be integrated or separated, and the operations of the systems and apparatuses may be performed by more, fewer, or other components. As another example, modifications may be made to the methods disclosed herein. The methods may include more, fewer, or other steps, and the steps may be performed in any suitable order.

What is claimed is:

1. A fastener for insertion into a substrate of a shipping container, comprising:

an RFID module;

a fastener body extending along a longitudinal axis and having a cylindrical upper portion and a connected cylindrical lower portion;

wherein the upper portion of the fastener body has an outer surface and includes a head and a first shank portion that is integrally connected to a distal end of the head;

wherein the upper portion comprises a helical thread that is integrally connected to and extends outwardly from the portions of the outer surface of the upper portion to form a threaded surface extending along a prescribed elongate length of the upper portion of the fastener body;

wherein the first shank portion defines a longitudinally extending recess extending between proximate the distal end of the upper portion and proximate the head of the upper portion that is complementarily sized and shaped to receive the RFID module, wherein the helical thread is integrally connected to and extends outwardly from the portions of the outer surface of the upper portion that are opposed to the recess to provide additional torsional strength to that portion of the first shank portion that defines the recess; and wherein the lower portion of the fastener body forms a drilling section configured to allow for the fastener body to drill into the substrate while concurrently removing material from the resultant hole, the drilling section having a second shank portion that has a distal end and a proximal end that is coupled to a distal end of the upper portion, wherein the outer surface of the first shank portion and the second shank portion have the same diameter, wherein the drilling section comprises at least one cutting edge that is configured to cut into the substrate to form a circular hole having a diameter substantially equal to the operative diameter of the distal end of the drilling section and at least one helical flute that winds helically about the longitudinal axis as the least one helical flute moves proximally away from the distal end of the second shank portion, wherein each at least one helical flute forms a discharge groove that extends up though the drilling section thereby allowing for receipt and operative discharge of bits of material cut by the cutting edge of the drilling section, and wherein the distal end of the second shank portion defines a drill tip that is coincident with the longitudinal axis of the fastener body.

2. The fastener of claim 1, wherein the first shank portion defines a trough that extends from the distal end of the first shank portion to the recess, and wherein at least a portion of a proximal end of the at least one helical flute connects to the trough at the distal end of the first shank portion to allow for the formation of an extended discharge groove.

3. The fastener of claim 2, wherein a portion of a proximal end of the trough is defined in the second wall of the recess, and wherein the trough extends parallel to the longitudinal axis of the fastener body.

4. The fastener of claim 1, wherein the first and second shank portions are integrally connected together.

5. The fastener of claim 4, wherein the fastener body is monolithically formed.

6. The fastener of claim 4, wherein the respective first and second shank portions are formed from the same metal or metal alloy material.

7. The fastener of claim 4, wherein the respective first and second shank portions are formed from differing metal or metal alloy materials.

8. The fastener of claim 1, wherein the prescribed elongate length of the threaded surface extends from proximate the distal end of the upper portion to proximate to a proximal end of the head.

9. The fastener of claim 1, wherein the helical tread has a course thread pitch to increase pullout resistance and to increase the structural resistance to deformity of the upper portion of the fastener body.

10. The fastener of claim 9, wherein the coarse thread pitch is between about 3.5 to about 5.

11. The fastener of claim 1, wherein the recess has an operative depth $d_1$ and width $w_1$ to complementarily receive the RFID module such that outer portions of the RFID module are positioned below the outer surface of the upper portion.

12. The fastener of claim 1, wherein the recess has a first wall proximate the distal end of the head, an opposed second wall that is proximate the distal end of the first shank portion of the upper portion, and a floor that extends between the respective first and second walls.

13. The fastener of claim 12, wherein the first and second walls of the recess are positioned normal to the longitudinal axis of the RFID fastener and the floor of the recess has a substantially planar shape that extends substantially parallel to the longitudinal axis of the fastener body.

14. The fastener of claim 13, wherein the floor of the recess is co-planer with the longitudinal axis of the fastener body.

15. The fastener of claim 1, wherein the at least one helical flute comprises a plurality of flutes and wherein the plurality of flutes are spaced equally about the circumference of the second shank portion of the fastener body.

16. The fastener of claim 1, wherein the diameter of the head of the upper portion and the diameter of the first shank portion has the same diameter.

17. A fastener for insertion into a substrate of a shipping container, comprising:

an RFID module;

a fastener body extending along a longitudinal axis and having a cylindrical upper portion and a connected cylindrical lower portion;

wherein the upper portion of the fastener body has an outer surface and includes a head and a first shank portion that is integrally connected to a distal end of the head;

wherein the upper portion comprises at least one helical thread that is integrally connected to and extends outwardly from the portions of the outer surface of the upper portion to form a threaded surface extending along a prescribed elongate length of the upper portion of the fastener body;

wherein the first shank portion defines a longitudinally extending recess extending between proximate the distal end of the upper portion and proximate the head of the upper portion that is complementarily sized and shaped to receive the RFID module, wherein the recess has an operative depth $d_1$ and width $w_1$ to complementarily receive the RFID module such that outer portions of the RFID module are positioned below the outer surface of the upper portion;

wherein the lower portion of the fastener body forms a drilling section configured to allow for the fastener body to drill into the substrate while concurrently removing material from the resultant hole, the drilling section having a second shank portion that has a distal end and a proximal end that is coupled to a distal end of the upper portion, wherein the outer surface of the first shank portion and the second shank portion have the same diameter, wherein the drilling section comprises at least one cutting edge that is configured to cut into the substrate to form a circular hole having a diameter substantially equal to the operative diameter of the distal end of the drilling section and at least one helical flute that winds helically about the longitudinal axis as the least one helical flute moves proximally away from the distal end of the second shank portion, wherein each at least one helical flute forms a discharge groove that extends up though the drilling section thereby allowing for receipt and operative discharge of bits of material cut by the cutting edge of the drilling section, wherein the distal end of the second shank portion defines a drill tip that is coincident with the longitudinal axis of the fastener body; and wherein the first shank portion further defines a trough that extends from a distal end of the first shank portion to the recess, wherein at least a portion of a proximal end of the at least one helical flute connects to the trough at the distal end of the first shank portion to allow for the formation of an extended discharge groove.

18. The fastener of claim 17, wherein a portion of a proximal end of the trough is defined in the second wall of the recess, and wherein the trough extends parallel to the longitudinal axis of the fastener body.

19. The fastener of claim 17, wherein the helical thread is integrally connected to and extends outwardly from the portions of the outer surface of the upper portion that are opposed to the recess to provide additional torsional strength to that portion of the first shank portion that defines the recess.

20. The fastener of claim 17, wherein the first and second shank portions are integrally connected together.

21. The fastener of claim 20, wherein the fastener body is monolithically formed.

22. The fastener of claim 20, wherein the respective first and second shank portions are formed from the same metal or metal alloy material.

23. The fastener of claim 20, wherein the respective first and second shank portions are formed from differing metal or metal alloy materials.

24. The fastener of claim 20, wherein the prescribed elongate length of the threaded surface extends from proximate the distal end of the upper portion to proximate to a proximal end of the head.

25. The fastener of claim 17, wherein the helical tread has a course thread pitch to increase pullout resistance and to increase the structural resistance to deformity of the upper portion of the fastener body.

26. The fastener of claim 17, wherein the recess has a first wall proximate the distal end of the head, an opposed second wall that is proximate the distal end of the first shank portion of the upper portion, and a floor that extends between the respective first and second walls, wherein the first and second walls of the recess are positioned normal to the longitudinal axis of the RFID fastener and the floor of the recess has a substantially planar shape that extends substantially parallel to the longitudinal axis of the fastener body.

27. The fastener of claim 26, wherein the floor of the recess is co-planer with the longitudinal axis of the fastener body.

28. The fastener of claim 17, wherein the at least one helical flute comprises a plurality of flutes and wherein the plurality of flutes are spaced equally about the circumference of the second shank portion of the fastener body.

* * * * *